United States Patent [19]

Kogo et al.

[11] 4,409,160

[45] Oct. 11, 1983

[54] METHOD FOR CONTROLLING THE THICKNESS OF A FILM PRODUCT

[75] Inventors: Nobuhiko Kogo; Yoshimitsu Tsutsui; Koji Kato; Hisao Kishigami, all of Nagoya, Japan

[73] Assignee: Mitsubishi Jukogyo Kabushiki Kaisha, Tokyo, Japan

[21] Appl. No.: 238,358

[22] Filed: Feb. 25, 1981

[30] Foreign Application Priority Data

Feb. 28, 1980 [JP] Japan .................................. 55-24457
Feb. 28, 1980 [JP] Japan .................................. 55-24458
Mar. 21, 1980 [JP] Japan .................................. 55-34898

[51] Int. Cl.³ ........................... G05D 5/03; B29F 3/00
[52] U.S. Cl. ................................. 264/40.1; 264/290.2; 425/141
[58] Field of Search .................... 264/290.2, 40.1, 210; 425/141

[56] References Cited

U.S. PATENT DOCUMENTS

| | | | |
|---|---|---|---|
| 3,122,783 | 3/1964 | Jolliffe et al. | 425/141 |
| 3,122,784 | 3/1964 | Jolliffe et al. | 425/141 |
| 3,212,127 | 10/1965 | Flook et al. | 425/141 |
| 3,347,960 | 10/1967 | Tenley | 425/141 |
| 3,694,726 | 3/1972 | Knowles | 264/210.1 |
| 3,782,873 | 1/1974 | Lynnknowles | 425/141 |
| 4,124,342 | 11/1978 | Akatsuka et al. | 425/141 |

*Primary Examiner*—Jay H. Woo
*Attorney, Agent, or Firm*—Wenderoth, Lind & Ponack

[57] ABSTRACT

A method for controlling the thickness of an extruded, biaxially elongated film product, in which thickness deviations are controlled automatically and without supervision.

In the method, correlation between positions along the widthwise direction of a film sheet and positions of die manipulation bolts of an extrusion die is obtained, and initially, a profile of the film sheet prior to lateral elongation is converged into a tolerable range; thereafter, the thickness of the film sheet after lateral elongation is measured, and if there are thickness deviations outside the tolerable range, a thickness regulation is effected by transmitting a signal corresponding to the thickness deviations to the appropriate die manipulation bolts.

2 Claims, 5 Drawing Figures

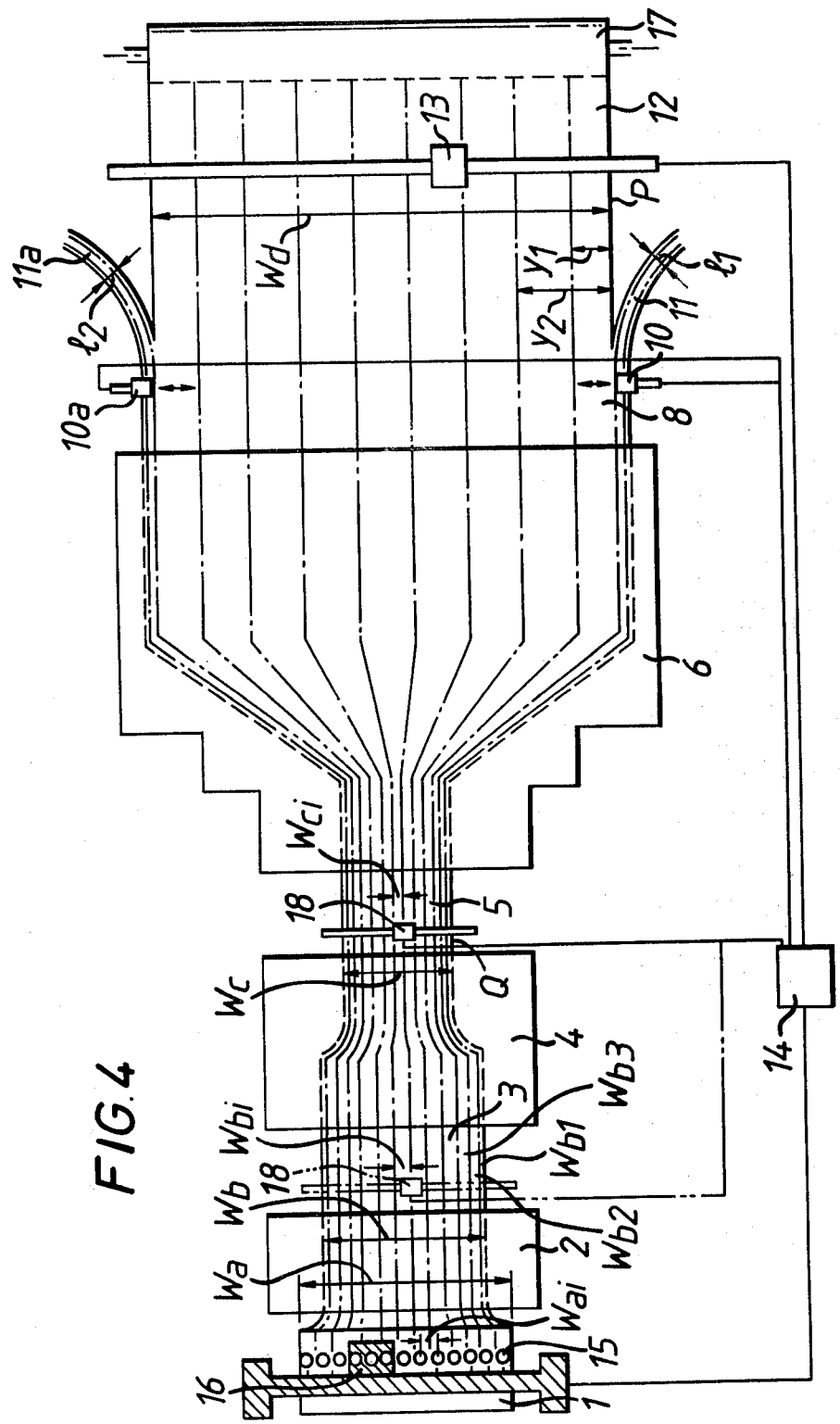

METHOD FOR CONTROLLING THE THICKNESS OF A FILM PRODUCT

BACKGROUND OF THE INVENTION

The present invention relates to a method for controlling the thickness of a film product.

In extrusion and elongating apparatus for producing a biaxially elongated film product from molten thermoplastic resins, when the extrusion die wears, or is replaced, or when the gap clearance of the die is adjusted for varying the thickness of the film product, or when an elongation rate per unit width of the die needs to be changed, normally, when the production is restarted, the quality of the film product is fairly bad initially, particularly with respect to thickness deviations over the width of the film product.

Thus, an adjustment to remove the thickness deviations needs to be effected after the restarting of the production. However, this adjustment operation is delicate, even if it is done by a skilled worker, and the precision in carrying out such an adjustment is limited. In addition, the working environment close to such apparatus is bad and hence, if the operation is conducted manually, there is a health hazard for the operator. On the other hand, in the case where the adjustment operation for the thickness deviation is effected by an automatic thickness deviation regulating device, the adjustment operations must be completed within a shorter period of time and the final precision with such automatic adjustment must be better than in the case of manual adjustment. However, due to the fact that a reliable and efficient method for determining the correlation between the positions of occurrence of thickness deviations across the width of the film product, and the positions of the manipulation bolts for the extrusion die has not been known heretofore, a satisfactory automatic regulating device is not available and has not been practically used.

SUMMARY OF THE INVENTION

An object of the present invention is to provide a solution for the above-described problem.

According to one aspect of the present invention, a method for automatically controlling the thickness of extruded biaxially elongated films is characterized in that a correlation between positions along the widthwise direction of a film sheet and the positions of the die manipulation bolts of an extrusion die is obtained, and initially, a profile of the film sheet prior to lateral elongation is converged into a tolerable range; thereafter, the thickness of the film sheet after lateral elongation is measured, and if there are thickness deviations outside the tolerable range, a thickness regulation is effected by transmitting a signal corresponding to the thickness deviations to the appropriate die manipulation bolts.

According to another aspect of this invention, a method for automatically controlling the thickness of extruded biaxially elongated films is characterised in that a correlation between positions along the widthwise direction of a film sheet prior to lateral elongation and the film sheet after lateral elongation and the positions of the die manipulation bolts of an extrusion die is obtained, and initially, a profile of the film sheet prior to lateral elongation is converged into a tolerable range with respect to a preset profile; the thickness over the width of the film sheet after lateral elongation is then measured, and if thickness deviations are present which are outside the tolerable range, then the profile prior to lateral elongation is corected, and the die manipulation bolts are manipulated so as to converge the profile prior to lateral elongation into a tolerable range with respect to the corrected profile; the measurement of the thickness of the film after lateral elongation is then repeated, whereby the thickness of the film sheet being produced can be continuously regulated, if necessary.

BRIEF DESCRIPTION OF THE DRAWINGS

In order that the invention may be readily understood, three preferred embodiments of extrusion and elongation apparatus constructed and adapted for use in accordance with the present invention will now be described with reference to the accompanying drawings in which:

FIG. 4 is a diagrammatic plan view similar to FIG. 1 of the basic apparatus for the second and third preferred embodiments described.

DESCRIPTION OF THE PREFERRED EMBODIMENTS

Figure 1:
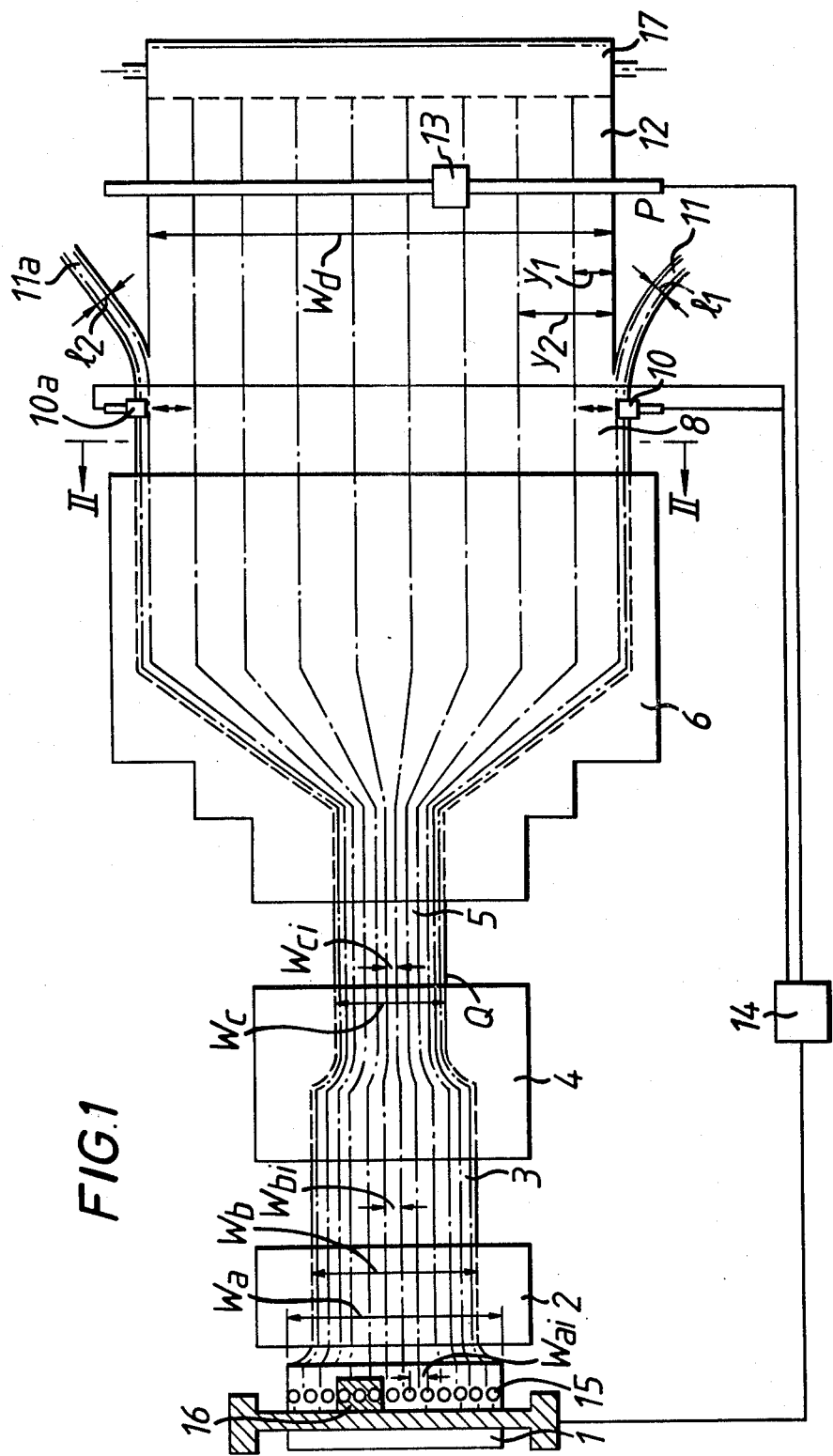
FIG. 1 is a diagrammatic plan view of the first preferred embodiment.
Figure 2:
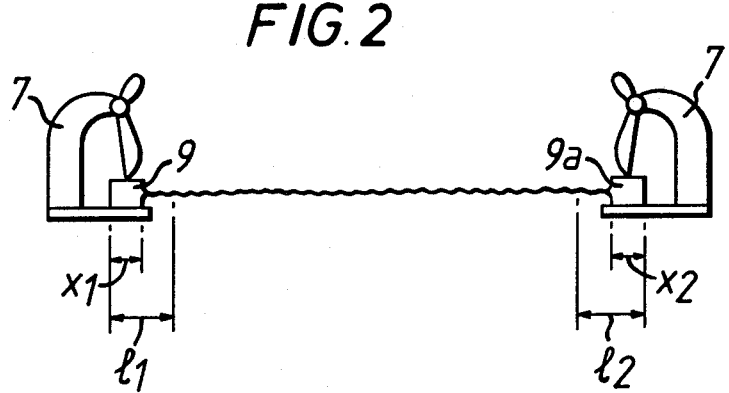
FIG. 2 is a view on the line II—II of FIG. 1, said view being applicable to the three embodiments described hereinafter.

Referring to FIGS. 1 to 3, in the first preferred embodiment, a molten thermoplastic resin is fed to the extrusion and elongating apparatus where it is initially extruded through the mouthpiece of a die in the form of a slit, and is set into a sheet form by a shaping and solidifying device 2, which is generally in the form of a group of rolls. The shaped sheet 3 is elongated in the direction of travel (i.e.-the extrusion direction) by means of a longitudinal elongation device 4 which is also generally in the form of a group of rolls.

The longitudinally elongated sheet 5 is then elongated in the direction at right angles to the direction of travel (i.e.-widthwise) by a lateral elongation device 6. This lateral elongation is carried out by holding the opposite edges of the sheet 5 by means of clips 7 and heating and elongating the sheet 5 within the elongation device 6. The longitudinally and laterally elongated sheet provides a thin film 8. However, as shown in FIG. 2, along the opposite edge portions of the film, within the distances $x_1$ and $x_2$ respectively, there are formed sections referred to generally as "ears" 9 and 9a, which have not been elongated at all.

Since elongated portions of the film close to the ears cannot be reliably controlled in thickness uniformity, slit sections 11, 11a (of widths "$l_1$" and "$l_2$") are cut away as shown in FIG. 1. The film web portion 12 left after the slit sections are cut away provides a product. However, as the product film 12 is drawn from the apparatus onto a winder 17 its thickness distribution (in the widthwise direction) is measured by a thickness meter 13. Deviations of the thickness of the product film are calculated by means of an arithmetic-control unit 14, and the width positions of the deviations are correlated with respective manipulation bolts 15 which extend across the width of the die 1. Depending upon the amount of the deviations of the product film, the amount of manipulation of the respective manipulation bolts 15 can be determined according to a predetermined calculation formula. The respective bolts, which are each provided with a screw thread adjustment arrangement, are then manipulated by being rotated by predetermined amounts by means of a die bolt manipulator 16 to adjust the gap clearance of the mouthpiece of the die.

Figure 3A:
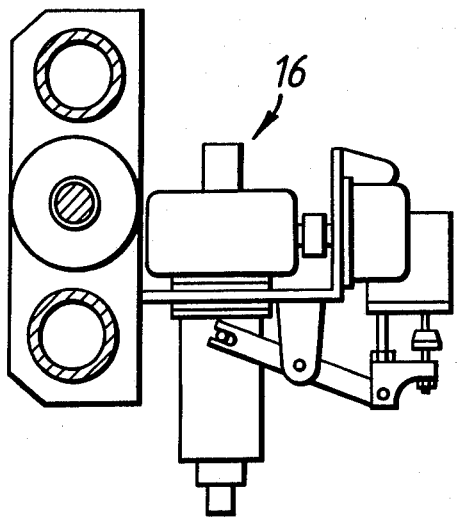
FIGS. 3(a) and 3(b) are enlarged fragmentary views of a die bolt manipulator and an extrusion die also applicable to the three embodiments described.
Figure 3B:
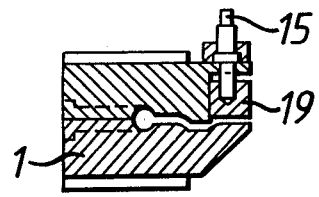

Referring to FIG. 3a, manipulation of the bolts 15 by their manipulator 16 causes adjustment movement of a lip 19 of the extrusion die 1 (see FIG. 3b) so as to adjust the gap clearance of the die mouthpiece. Thus, by controlling the gap clearance, the amount of resin extruded through the die mouthpiece is controlled, and hence the product film 12 can be adjusted in thickness.

With regard to the operation of the illustrated extrusion and elongating apparatus, the manipulation bolts 15 are spaced along the die 1 at equal intervals $W_{ai}$, and the extruded molten resin contracts in the widthwise direction (necking) in the course of being shaped by the shaping and solidifying device 2, so that the width ($W_b$) of the sheet 3 is smaller than the width ($W_a$) of the mouthpiece of the die 1. However, the magnitude will change depending upon the shaping conditions. The width of the sheet corresponding to each bolt 15 (a strip width) is equal to ($W_{bi}$). This width ($W_{bi}$) will be different depending upon the position along the widthwise direction on the sheet 3, and it will become smaller as the position approaches the opposite edge portions.

The correlation between the equal interval pitch ($W_{ai}$) of the manipulation bolts 15 and the strip width ($W_{bi}$) is quantitatively reproducible so long as the shaping condition is determined, and therefore, the correlation could be preliminarily obtained through experiment. In addition, since the width ($W_b$) of the sheet 3 and the strip width ($W_{bi}$) have a fixed correlation, the correlation formula can conveniently be preliminarily obtained. On the other hand, a necking phenomenon would also similarly arise upon longitudinal elongation, so that the width of the sheet is reduced to ($W_c$), and the strip width ($W_{ci}$) can also be preliminarily obtained through experiment.

As discussed above, the lateral elongation to produce film 8 causes unelongated "ears" 9 and 9a to be left, and the widths $x_1$ and $x_2$ of the ears will vary depending upon the conditions of lateral elongation, or the thickness of the sheet 5 corresponding to the proximities of the ears 9 and 9a. However, as these ears are not elongated laterally, their positions are the same as the positions of the ears of the sheet 5 after its longitudinal elongation. Although the widths $l_1$ and $l_2$ of the slit sections 11 and 11a to be cut away could be automatically measured, they could be applied as fixed data for calculation purposes because they generally have fixed values.

The width ($W_d$) of the product film 12, as well as the relation between the positions along the widthwise direction and the thickness, are measured by means of the thickness meter 13, and an average magnification of lateral elongation X of the elongate portion (including the slit sections 11 and 11a, can be calculated by the following formula:

$$X = \frac{W_d + (l_1 - x_1) + (l_2 - x_2)}{W_c - x_1 - x_2} \quad (1)$$

In general, the average manification of the lateral elongation is 8-10 times for polypropylene, and about 3-4 times for polyethylene terephthalate, polystyrene and nylon. The correlation between the positions along the widthwise direction of the product film 12 and the positions of the manipulation bolts 15 can be presumed through the following process.

A point P along the edge of the product film 12 corresponds to a point at a distance of:

$$\left( x_1 + \frac{l_1 - x_1}{X} \right) \quad (2)$$

from an edge Q on the longitudinally elongated sheet 5. Therefore, the relative positioning between the point P along the edge of the product film 12 and the manipulation bolts 15 can be determined on the basis of the above-described relation between the strip width ($W_{ci}$) of the sheet 5 after longitudinal elongation and the manipulation bolts 15.

In addition, it can be calculated that the width extending a distance $y_1$ from the point P corresponds to the i-th one of the manipulation bolts 15. The width extending a distance $y_2 - y_1$ from the point P corresponds to the (i+1)-th manipulation bolt 15, etc. Likewise, the correlation between the product film 12 and the manipulation bolts is calculated, and average deviations of the product film 12 corresponding to the respective manipulation bolts 15 are calculated on the basis of the relation between the positions along the widthwise direction of the film and the deviations in thickness as measured by the thickness meter 13. The amount of manipulation of the respective manipulation bolts is then calculated on the basis of the deviations according to a predetermined calculation formula, so as to adjust the gap clearance of the mouthpiece of the die 1 by means of the die bolt manipulator 16, and to thereby control the amount of molten resin extruded from the mouthpiece. All these calculations are carried out in the arithmetic-control unit 14.

When the elongated sheet film reaches ear width measuring devices 10 and 10a, the ear widths $x_1$ and $x_2$ are measured, and thereafter the thickness of the product is measured. As a result, if a desired uniformity has not been realized, the manipulation bolts 15 are again manipulated through a similar process, and a film having a good uniformity of thickness can thereby be obtained without the need to have an operator in attendance.

In the case where the widths $x_1$ and $x_2$ of the ears are stable and there is no need to measure the ear widths with the ear width measuring devices 10 and 10a, the widths could be manually measured and applied to the arithmetic-control unit 14 as its input data. In addition, in the case where the amount of lateral elongation at a particular location is different due to characteristics of the lateral elongation device, it is only necessary to achieve calculation after correcting the amount of lateral elongation at that location.

In the case of coarse adjustment, if the thickness along the widthwise direction of the sheet 3 prior to longitudinal extension is measured instead of measuring the thickness along the widthwise direction of the sheet 5 after longitudinal extension, the time required for coarse adjustment prior to lateral extension can be further shortened.

Since the method described above makes it possible to correlate the positions on the product film to the positions of the manipulation bolts continuously and automatically, a film product having good uniformity of thickness across its width can be produced without constant supervision. Therefore, the present invention is very useful insofar as it does not require the high degree of skill and constant supervision in a bad working environment of an operator, which has previously been required.

Referring to FIG. 4, the second preferred embodiment is basically the same as the first embodiment described above and like parts have been given the same reference numerals. However, in this second embodiment a further thickness measuring device 18 is provided to measure thickness along the widthwise direction of the sheet 3 while it is being elongated.

Thus, as shown in FIG. 4, the thickness along the widthwise direction of the sheet 5 immediately after longitudinal elongation is measured by the thickness measuring device 18, and any thickness deviation of the sheet corresponding to one or more die manipulation bolts 15 with respect to a preset profile is calculated by the arithmetic-control unit 14. On the basis of any deviation measured, the amount of manipulation of the manipulation bolts 15 is calculated according to a predetermined formula, and an appropriate manipulation of the die bolts 15 is made to adjust the gap clearance of the die via its adjustment lip 19 so that the desired profile, in the widthwise direction of the sheet, is made to converge into a tolerable range. An alternative position for the measuring device 18 is immediately after the shaping and solidifying device 2 as shown by the chain-dotted illustration of device 18 in FIG. 4.

The extent of convergence may be determined on the basis of a standard deviation value, a dispersion value, or a maximum deviation value of the deviations of the sheet corresponding to the die manipulation bolts 15 with respect to a preset profile. According to the experiments of the inventors of the present invention, it has been discovered that if the standard deviation value with respect to the preset profile is converged to 0.5%, the deviations of the film product 12 after lateral elongation would fall in the range of ±3–±5%.

$$\text{standard deviation } \sigma = \sqrt{\frac{\sum_{i=1}^{n}(P_i - P_{oi})^2}{n}} \quad (3)$$

P$_i$: a preset profile corresponding to the i-th bolt
P$_{oi}$: a measured profile corresponding to the i-th bolt.

With regard to the preset profile, it is only necessary to measure the profile of the sheet 5 prior to lateral elongation when the product film 12 after lateral elongation falls in the tolerable range. However, even if the profile prior to lateral elongation is strictly converged to the desired profile, the product film 12 after lateral elongation does not always fall in the tolerable range of the film product due to a slight difference in the elongation conditions, and hence, after the profile prior to lateral elongation has been converged, it is necessary to effect fine adjustment with respect to the product film after lateral elongation. Such fine adjustment can be effected as described hereinbefore with reference to the first preferred embodiment using the formula:

$$X = \frac{W_d + (l_1 - x_1) + (l_2 - x_2)}{W_c - x_1 - x_2} \quad (1)$$

Figure 5:
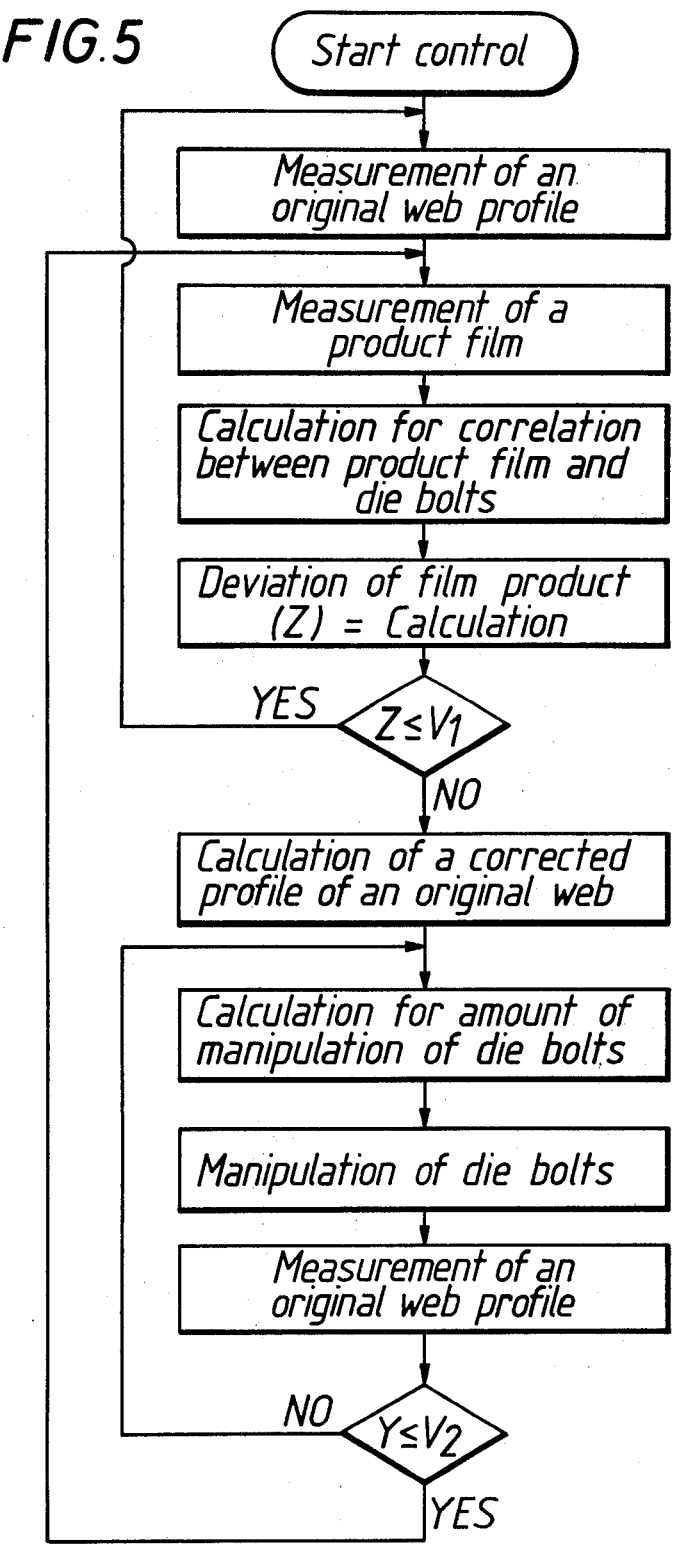
FIG. 5 is a flow chart for the third preferred embodiment.

Referring again to FIG. 4 and also to FIG. 5 of the drawings, the apparatus is mostly identical with that described above for the second embodiment. Thus, like parts are given the same reference numerals. With this embodiment, the method of operation is basically the same as that for the second embodiment, but is somewhat more detailed. Thus, the complete operation of this embodiment will now be fully described.

The respective die manipulation bolts 15 are disposed at equal intervals on the die 1 with a pitch (W$_{ai}$), and the molten thermoplastic resin extruded from the die is shaped into a sheet 3 by the shaping and solidifying device 2 so as to contract in the widthwise direction (necking), and hence, the width (W$_b$) of the sheet 3 is smaller than the width (W$_a$) of the mouth piece of the die 1. In addition, the widths (W$_{b1}$), (W$_{b2}$), (W$_{b3}$) . . . (W$_{bi}$) of the strip shaped portions of the sheet 3 corresponding to the respective die manipulation bolts 15 are varied along the widthwise direction so that they may be reduced towards the opposite side edge portions, and the correlation between the equal interval pitch (W$_{ai}$) of the respective die manipulation bolts 15 is reproducible so long as the shaping condition is determined, and is preliminarily sought through experiment. Also, since the width (W$_b$) of the sheet 3 and the strip width (W$_{bi}$) are correlated to each other, if a correlation formula is preliminarily sought, it is convenient for control of the thickness. As the necking phenomenon likewise arises in the longitudinal elongation device 4, the above-mentioned operation is also applicable to the section between the shaping and solidifying device 2 and the longitudinal elongation device 6, and so, the correlation between the strip widths (W$_{bi}$) and (W$_{ci}$) is preliminarily sought through experiment. On the basis of the above-mentioned facts, the correlation between the positions along the widthwise direction of the sheet 5 prior to lateral elongation and the respective die manipulation bolts 15 can be obtained. Here, paying attention to the fact that the time required for adjustment of a thickness of the film 8 after lateral elongation can be shortened if the profile of the sheet 5 prior to lateral elongation is converged to a certain extent, at first, the profile of the sheet 5 prior to lateral elongation, (i.e.-the original web profile) is converged into a certain tolerable range with respect to a preset profile. More particularly, a distribution along the widthwise direction of the thickness of the sheet 5 prior to lateral elongation (after longitudinal elongation) is measured by means of the thickness meter 18. The results of this measurement are transmitted to the arithmetic-control unit 14 and the thickness deviation with respect to the preset profile for each die manipulation bolt 15 is calculated by the arithmetic-control unit 14. On the basis of the results of calculation, the amount of manipulation of the repective die manipulation bolts are calculated according to a predetermined formula, and the results are transmitted to the automatic bolt manipulating device 16 to rotate the respective bolts by predetermined amounts. As a result, the thickness deviations are corrected by adjusting the extrusion rates corresponding to the respective bolts 15 by deforming the die adjustment lip 19, whereafter adjustment in thickness is measured again by means of the thickness meter 18. By repeating such operations, the desired profile of the sheet along the widthwise direction is finally converged into a tolerable range. The degree of convergence could be determined on the basis of a standard deviation value, a dispersion value, or a maximum deviation value with respect to the preset profile for the respective die manipulation bolts 3. According to experiment, if a standard deviation value $\omega$ with respect to a preset profile represented by the equation of:

$$\sigma = \sqrt{\frac{\sum_{i=1}^{n}(P_i - P_{oi})^2}{n}} \qquad (3)$$

where $P_i$ represents a preset profile corresponding to the i-th die manipulation bolt and $P_{oi}$ represent a measured profile corresponding to the i-th die manipulation bolt, is converged into 0.5%, then the deviations of the film 15 after lateral elongation would fall in the range of ±3–±5%. With regard to the preset profile, it is only necessary to set it by measuring the profile of the sheet 5 prior to lateral elongation, when the product film 12 after lateral elongation falls in the tolerable range. However, even if the profile of the sheet 5 prior to lateral elongation is strictly converged to the desired profile, the product film after lateral elongation does not always fall in the tolerable range of the product due to slight differences in the elongation conditions. Hence, after the profile prior to lateral elongation has been converged, it is necessary to effect fine adjustment on the basis of the product film after lateral elongation. This fine adjustment is effected as follows: Ears 9 and 9a are produced on the film 8 which has been laterally elongated by device 6; the ears, as discussed above, cannot be extended laterally, and the widths ($x_1$) and ($x_2$) will vary, depending upon the thickness of the sheet 5 in the proximities of the ears 9 and 9a. The ear widths ($x_1$) and ($x_2$) are measured by ear width measuring devices 10 and 10a, but since the ears are not laterally elongated, their positions are the same as the positions of the ears of the sheet 5 prior to lateral elongation. In addition, although the widths ($l_1$) and ($l_2$) of slit sections 11 and 11a to be cut away could be automatically measured, they could be applied as fixed data upon calculation, because generally they have fixed values. The width ($W_d$) of the product film 12 as well as the relation between the positions along the widthwise direction and thickness, are measured by means of the thickness meter 13. The results of this measurement are transmitted to the arithmetic-control unit 14, and an average magnification of lateral extension X of the extended portion (including the slit sections 11 and 11a), that is:

$$X = \frac{W_d + (l_1 - x_1) + (l_2 - x_2)}{W_c - x_1 - x_2} \qquad (1)$$

is calculated by said arithmetic-control unit. In general, the average magnification of lateral extension is 8–10 times for polypropylene, and about 3–4 times for polyethylene telephthalate, polystyrene and nylon. The correlation between the positions along the widthwise direction of the product film 12 and the positions of the die manipulation bolts 15 can be presumed through the following process. A point (P) along the edge of the product film 12 corresponds to a point at a distance of:

$$\left(x_1 + \frac{l_1 - x_1}{X}\right) \qquad (2)$$

from a point (Q) along the edge of the sheet 5 prior to lateral elongation. Therefore, the relative positioning between the point (P) along the edge of the product film and the die manipulation bolts 15 can be determined on the basis of the above-described relation between the strip width ($W_{ci}$) of the sheet 5 prior to lateral elongation and the die manipulation bolts 15. That is, it can be calculated that the interval falling in the distance ($y_1$) from the point (P) corresponds to the i-th one of the die manipulation bolts 15. It can also be calculated that the interval falling in the distance $y_1$ to $y_2$ from the point (P) corresponds to the (i-1)-th one of the die manipulation bolts 15. Subsequently, the correlation between the respective intervals of the product film and the respective die manipulation bolts are calculated in a similar manner; then, a standard deviation value (Z) of the product film corresponding to the respective die manipulation bolts is calculated on the basis of the relation between the positions along the widthwise direction of the product film and the thickness deviations as measured by the thickness meter 13, and said standard deviation value is compared with a tolerable value ($V_1$). If $Z \leq V_1$ is fulfilled, then the operation cycle of (measurement of an original web profile)→(measurement of a product film)→(calculation for the correlation between a product and bolt positions)→(calculation of deviation (Z) of a product) is repeated as shown in FIG. 5. On the other hand, if the deviation comes out of the tolerable range fulfilling the relation $Z > V_1$, then the preset profile of the sheet 5 prior to lateral elongation is corrected to set a new profile, the amounts of manipulation of the bolts corresponding to the new profile are calculated, the die manipulation bolts are manipulated on the basis of the calculated values, annd, after the lapse of a predetermined period of time, the original web profile of the sheet 5 prior to lateral elongation is measured. If the measured value (Y) comes out of the tolerable range ($V_2$) fulfilling the relation $Y > V_2$, then it is brought to within the tolerable range by again recalculating the amounts of manipulation of the die manipulation bolts 15. On the other hand, if the measured value (Y) falls within the tolerable range ($V_2$) fulfilling the relation $Y \leq V_2$, then the measurement of the product film 12 after lateral elongation is effected again, and the operations starting from the above-described "measurement of a product film" are repeated. It is to be noted that all of the above-described calculation and control is conducted by the arithmetic-control unit 14. The product film 12 obtained through the above-described method for controlling the thickness is taken up by the winder 17. In the case where the ear widths ($x_1$) and ($x_2$) are stable and there is no need to measure them by means of the ear width measuring device 10 and 10a, the widths could be manually measured and input to the arithmetic-control unit 14. In addition, in the case where the magnification of lateral extension at a particular location is different due to the characteristics of the lateral elongation device 6, it is only necessary to make correction of the magnification of lateral elongation at that portion. Moreover, with regard to the profile control of the sheet 5 prior to lateral elongation, a distribution along the widthwise direction of the thickness of the sheet 3 prior to longitudinal elongation could be measured in place of the measurement of the distribution along the widthwise direction of the thickness of the sheet 5 prior to lateral elongation.

While the present invention has been described above in connection to preferred embodiments thereof, it will be appreciated that various changes and modifications can be made within the scope of the present invention.

We claim:

1. A method for automatically controlling the thickness of extruded biaxially elongated films characterised in that a correlation between positions along the widthwise direction of a film sheet and positions of die manipulation bolts of an extrusion die is obtained, and initially, a profile of the film sheet prior to lateral elongation is converged into a tolerable range; therafter, the thickness of the film sheet after lateral elongation is measured, and if there are thickness deviations outside the tolerable range, a thickness regulation is effected by transmitting a signal corresponding to the thickness deviations to appropriate die manipulation bolts.

2. A method for automatically controlling the thickness of extruded biaxially elongated films characterised in that a correlation between positions along the widthwise direction of a film sheet prior to lateral elongation and the film sheet after lateral elongation and positions of die manipulation bolts of an extrusion die is obtained, and initially, a profile of the film sheet prior to lateral elongation is converged into a tolerable range with respect to a preset profile; the thickness over the width of the film sheet after lateral elongation is then measured, and if thickness deviations are present which are outside the tolerable range, then the profile prior to lateral elongation is corrected, and the die manipulation bolts are manipulated so as to converge the profile prior to lateral elongation into a tolerable range with respect to the corrected profile; the measurement of the thickness of the film after lateral elongation is then repeated, whereby the thickness of the film sheet being produced can be continuously regulated, if necessary.

* * * * *